United States Patent [19]

Reed et al.

[11] 3,867,335
[45] Feb. 18, 1975

[54] TAPE JOINT CEMENT ADDITIVE

[75] Inventors: Delmer H. Reed, South Charleston, W. Va.; Edward C. Seltzer, Mt. Holly, N.J.

[73] Assignee: Union Carbide Corporation, New York, N.Y.

[22] Filed: Mar. 31, 1972

[21] Appl. No.: 240,293

Related U.S. Application Data

[63] Continuation of Ser. No. 743,306, July 9, 1968, abandoned.

[52] U.S. Cl. ............. 260/42.52, 156/331, 156/332, 260/29.6 RW, 260/29.6 WA, 260/29.6 PS, 260/42.55, 260/79.3 M, 260/895
[51] Int. Cl. .............................................. C08f 45/04
[58] Field of Search ...... 260/29.6 RW, 260/29.6 PS, 260/29.6 WU, 29.6 WA, 29.6 EM, 41, 79.3 M, 895, 42.52

[56] References Cited
UNITED STATES PATENTS

| 3,084,133 | 4/1963 | Sirota | 260/29.6 B |
|---|---|---|---|
| 3,095,404 | 6/1963 | Lincoln et al. | 260/88.3 R |
| 3,126,355 | 3/1964 | Birten et al. | 260/29.6 PS |
| 3,196,122 | 7/1965 | Evans | 260/41 R |
| 3,197,429 | 7/1965 | Baatz | 260/29.6 WA |
| 3,483,156 | 12/1969 | Mills et al. | 260/29.6 |

OTHER PUBLICATIONS

Polymer X-150, Advance Technical Information, Union Carbide Corp., New York, Nov. 1964, F-41177.

*Primary Examiner*—Morris Liebman
*Assistant Examiner*—J. H. Derrington
*Attorney, Agent, or Firm*—Charles J. Metz

[57] ABSTRACT

A tape joint cement composition comprising an inert filler, a poly(vinylacetate) binder and from 0.5 to 5.0% by weight based on the weight of the poly(vinylacetate) of poly(1,2-dimethyl-5-vinyl-pyridinium methyl sulfate). A method of preparing a ready-mix tape joint cement and a method of preparing a dry-mix tape joint cement utilizing said compound are also included.

4 Claims, No Drawings

TAPE JOINT CEMENT ADDITIVE

This is a continuation of application Ser. No. 743,306, filed July 9, 1968, now abandoned.

This invention relates in general to tape joints cement and more particularly to a cement additive for joint cements which improves the properties such as workability and low temperature adhesion of the joint cement. In another aspect, the invention provides a novel method for the preparation of a sensibly dry-free-flowing composition adapted to be mixed with water to form a tape joint cement.

Tape joint cements are utilized in the application of wallboard, their function being to fill the spaces between adjoining boards to provide a smooth seamless surface. Typically, the space is filled with the tape joint cement and lapped for an inch or two to either side of the wallboard, and perforated paper tape is pressed into the cement until embedded, whereupon excess cement is wiped clean and the cement in which the tape is embedded is thereafter permitted to dry. If desired, additional coats can be applied to effect a particular object, i.e., whether the surface is to be painted, wall papered, etc. Since the tape joint cement is normally applied to uncompleted structures, that is, structures which do not have facilities for heating or cooling, it is necessary that the tape joint cement possess adhesive qualities which remain reasonably constant over a wide range of temperatures. For example, when the tape joint cement is applied to the wallboard during a cold season, it is generally applied at the temperature which exists outside of the structure and can be as low as 32°F. or lower. On the other hand, it is not uncommon to apply the tape joint cement at temperatures of 90°F. or higher.

At present, tape joint cements are marketed in two forms, namely, a "ready-mix" which is a finished formulation needing only stirring before application and a "dry-mixture" which is in the form of a sensibly dry free-flowing powder to which water is added and stirred until a workable consistency is attained. In either form, the essential components are a major proportion of an inert filler, such as, for example, calcium carbonate, clay, mica, silica, asbestos, and the like, and a minor proportion of a binder which serves to hold the cement together and prevent crumbling. The binder also adhesively bonds the cement to the wallboard and secures the applied tape thereto.

Various materials are being employed as the binder ingredient in tape joint cements. Recently poly(vinylacetate) resins have received considerable attention as the binder material becuase the poly(vinylacetate) resins have overcome the important objections and disadvantages of using other binding materials known to the art. For example, when employing casein as the binder material in dry-mix systems, the mixture with water gives a uniform composition only with great difficulty and, moreover in dry-mix and ready-mix systems, the casein is subject to putrefaction on aging. Unfortunately, however, when poly(vinylacetate) resins are employed in ready-mix systems, the resulting tape joint cement generally suffers from lack of proper workability and affords poor low temperature adhesion. In the preparation of dry-mix cements, the problems are even more pronounced because the poly(vinylacetate) resins must be employed in a particular manner such as for example in the manner described in U.S. Pat. No. 3,084,133, or in the method described in the application of E. J. Mills and J. F. Suter, Ser. No. 600,741, filed Dec. 12, 1966, now U.S. Pat. No. 3,483,156. This is so because the poly(vinylacetate) resins in dry form cannot be blended satisfactorily with the dry filler because of poor dispersion when water is added. The use of spray-dried poly(vinylacetate) resins as the binder material permits dry-mixing, however elaborate precautions must be taken to insure that the blend of filler and spray-dried poly(vinylacetate) remains dry until ready for use. Thus, it will be seen that when employing poly(vinylacetate) as the binder, that two different forms of the poly(vinylacetate) are required to form either the ready-mix or dry-mix cements. Moreover, as mentioned previously, the resulting cement has poor workability and poor adhesion at low temperatures.

We have discovered a chemical additive which can be incorporated into tape joint cement compositions employing polyvinylacetate resins as the binder material which additive improves the low temperature adhesion and workability of the tape joint cement. More significantly however, we have found that the chemical additive of the present invention permits the preparation of either a ready-mix or dry-mix from the same form of poly(vinylacetate) starting material as will be described hereafter. The chemical additive of the present invention is poly(1,2-dimethyl-5-vinyl-pyridinium methylsulfate) referred to hereafter as "chemical additive." The polymer generally has a reduced viscosity of 0.8–1.5 in 0.5 M sodium bisulfite, and can be obtained commercially under the trade name POLYMER X—150 sold by Union Carbide Corporation. In general the chemical additive can be prepared by polymerizing in water solution, the monomer 1,2-dimethyl-5-vinyl-pyridinium methyl sulfate using a peroxide catalyst such as potassium persulfate.

As mentioned previously, the chemical additive of the present invention can be utilized with ready-mix or dry-mix tape joint systems comprising poly(vinylacetate) as the binder material. In ready-mix systems, the additive can be added simultaneously with the other ingredients such as filler, polyvinylacetate, water etc., and the whole admixture then processed by conventional technique for producing ready-mix tape joint cement. Alternatively the chemical additive can be added to the ready-mix as such i.e., after admixture of the formulating ingredients.

When added in dry-mix systems, the chemical additive can be incorporated with the poly(vinylacetate) binder, whether in the form of sprayed dried poly(vinylacetate), or in an aqueous dispersion of poly(vinylacetate) as taught in the method disclosed in U.S. Pat. No. 3,084,133 or in the application of E. J. Mills and J. F. Suter above referred to. The additive can also be added to the formulated dry-mix as such or added with the water at the time the water is added to the dry-mix. It is preferred however, to employ the chemical additive in dry-mix systems in the form of a free-flowing powder. Generally, the chemical additive is produced as a 30 percent aqueous solution, which can be processed by conventional techniques to remove the water content. Merely as illustrative, the solution can be admixed with the filler such as calcium carbonate, agitated, and thereafter dried. The dried material is then micropulverized through a screen into a free-flowing powder.

The chemical additive is added to the joint cement ingredients or to the finished joint cement in an amount of about 0.5 to about 5.0 per cent, preferably 2.5 to 3.5 per cent based on the weight of the poly(vinylacetate) latex binder solids.

In a representative technique of operation and utilizing the procedure described for example in the application of Mills and Suter for producing a dry-mix tape joint cement, above referred to, an aqueous dispersion of poly(vinylacetate) is prepared containing from about 40 to about 65 percent by weight resin solid having a particle size in the range from about 0.1 to about 8 microns. The resin may be a homopolymer of vinylacetate or a copolymer of vinylacetate with an ethylenically unsaturated polymerizable comonomer such as dibutylmaleate, dibutylfumarate, vinylpropionate, ethylacrylate, butylacrylate, isobutylacrylate, 2-ethylhexylacrylate, and the like. The aqueous dispersion of poly(vinylacetate) is mixed with powdered mica in a manner such as to intimately mix the two materials while avoiding caking of the materials. The chemical additive can be added in conjunction with the aqueous dispersion of poly(vinylacetate) or as a separate aqueous solution in an amount of about 0.5 to 5.0 per cent or as described previously the chemical additive can be added directly to the dry-mix formulation resulting from carrying out the teachings of the above process.

An important advantage of the chemical additive of the present invention is the fact that a dry-mix can be prepared from a ready-mix tape joint cement without any significant loss of adhesive properties provided by the chemical additive at room temperature. In other words, the chemical additive can be incorporated in ready-mix systems to provide better workability and good room and low temperature adhesion properties, and optionally if desired, the ready-mix can be treated to provide a dry-mix which can subsequently be mixed with water without any significant loss of room temperature adhesion properties. To prepare a dry-mix from a ready-mix tape joint cement a ⅛ inch thick, or less, layer of ready-mix is applied to teflon or similarly covered glass cloth and allowed to dry. The drying time can be enhanced by using forced air over the surface and/or mild heating conditions (i.e. 60°C. or less). The dried cement is then removed from the cloth and broken into particles small enough to be fed into a hammer mill type Micro Pulverizer. The cement is pulverized through 0.035 to a 0.020 inch screen preferably a 0.027 inch screen, into an appropriate receiver. The pulverized material is a dry free-flowing fine powder. However, it should be noted that the binder will sometimes ball-up when screens finer than about 0.020 inches are used, or if the feed is too damp. An added advantage of the chemical additive of the present invention is that it can be incorporated into tape joint cement compositions together with other normally added ingredients such as plasticizer, filming acids, anti-foams and the like without hindering the features and advantages of the other added ingredients.

The invention is further illustrated by the following specific examples of its practice.

EXAMPLE 1

Preparation of "ready-mix" tape joint cement without adding the chemical additive thereto.

A ready-mix tape joint cement was prepared in accordance with the following recipe:

| Ingredients | % Composition Dry Weight Basis |
| --- | --- |
| Thickener—"Cellosize" QP-10,000 (Union Carbide Corporation) | 0.50 |
| Bacteriastat—"Dowicide" A, (Dow Chemical Co.) | 0.20 |
| Dispersant—"Daxad" 30 (Dewey and Almy) | 0.30 |
| Binder-Poly(vinylacetate)UCAR Latex WC—130 (Union Carbide Corporation) | 6.00 |
| Plasticizer-Dibutylphthalate | 0.60 |
| Filming Aid-Ethylene Glycol (Union Carbide Corporation) | 1.00 |
| Asbestos, (7—RF—02) (Johns Manville) | 9.00 |
| Mica | 15.00 |
| Clay, ASP—400 (Minerals & Chemicals, Phillip) | 15.00 |
| "Attagel"—40 (Thickener) (Minerals & Chemicals, Phillip) | 2.00 |
| Nopco PD No. 1 Antifoam (Nopco Chemical Co.) | 0.10 |
| Calcium Carbonate, No. 1 White (Thompson-Weinman) | 50.30 |

The ready-mix was prepared from the above ingredients by first preparing a "Cellosize" thickener concentrate containing 2.0% by weight "Cellosize" QP—10,000, 0.80% "Dowicide" A and 1.20% by weight "Daxad" 30 dispersant in water. 1,000 Grams (960 poly(vinylacetate) grams water) of the thickener concentrate was then added to a one-gallon Baker-Perkins sigma blade containing 1019 grams of distilled water and the contents were then mixed thoroughly. Thereafter, 444 grams of poly(vinylacetate) (240 grams of total solids and 174 grams of water), 24 grams of dibutylphthalate, and 40 grams of ethylene glycol were added and mixed until the contents were homogeneous. To the contents in the mixer, there was then added 360 grams of asbestos, 600 grams mica, 600 grams clay, 80 grams Attagel—40, 4 grams of Antifoam and 2,012 grams of calcium carbonate. The contents were then mixed for about 2 hours at 79 r.p.m.

The above prepared ready-mix was evaluated for workability, room temperature and low temperature adhesion. The low temperature and room temperature adhesion was determined generally by the procedure described in ASTM (C474-64).

For room temperature adhesion, the joint cement was allowed to dry 24 hours at 73°F. whereas for low temperature adhesion the assemblies were allowed to dry for one week at 43°F. and 81 per cent relative humidity. Thereafter, the assembly was removed and allowed to dry for 24 hours at 73°F. and 50 per cent relative humidity.

The workability was determined on the ability of the material to cover a nail-hole cracking test board with one screed of a broadknife and without a tendency of the tape joint cement to pull out of the holes during the screed.

The results are indicated below:

ADHESION
72°F.—50% R.H. — 99.9
43°F.—81% R.H. — 45

WORKABILITY

Fair to Good

EXAMPLE 2

The same ready-mix as in Example 1 was prepared except that 3.0 percent additive of the present invention was added based on the weight of the poly(vinylacetate). The tests described in Example 1 were repeated and the results are indicated below.
ADHESION
72°F.—50% R.H. — 99.9
43°F.—81% R.H. — 99.4

WORKABILITY

Very Good

EXAMPLE 3

A ready-mix cement was prepared in a manner similar to Example 1 from the following recipe.

| Ingredients | % Composition Dry Wt. Basis |
| --- | --- |
| Calcium Carbonate | 49.28 |
| Mica | 15.00 |
| Asbestos | 9.00 |
| Clay | 15.00 |
| Attagel—40 | 2.00 |
| Cellulosic Thickener ("Cellosize" QP—10,000) Union Carbide Corp. | 0.50 |
| Bacteriastat ("Dowicide" A) — Dow Chemical Co. | 0.20 |
| Poly(vinylacetate) latex | 6.00 |
| Dibutyl phthalate | 1.50 |
| Dispersant (Dewey and Almy "DAXAD" 30) | 0.30 |
| Ethylene Glycol | 1.00 |
| Chemical Additive | 0.12 |
| Antifoam (Nopco PD No. 1) — Nopco Chemical Co. | 0.10 |

As will be seen in the above, the cement contained about 2.0 percent chemical additive of the invention and about 20 percent plasticizer based on the weight of the poly(vinylacetate) resin. The adhesion and workability was evaluated as in Example 1 and the results are indicated below.
ADHESION
72°F.—50% R.H. — 100.0
43°F.—81% R.H. — 99.9

WORKABILITY

Very Good

EXAMPLE 4

A tape joint ready-mix cement was prepared using a spray dried poly(vinylacetate) latex.
The ingredients for preparing the ready-mix compositions are from the following recipe:

| Ingredients | % Composition Dry Wt. Basis |
| --- | --- |
| Carbonate | 50.12 |
| Mica | 15.00 |
| Asbestos | 9.00 |
| Clay | 15.00 |
| Attagel—40 | 2.00 |
| Cellosize QP—10,000 (Cellulosic Thickener) | 0.50 |
| Bacteriastat ("Dowicide" A) | 0.20 |
| Spray-Dried poly(vinylacetate) | 6.00 |

—Continued

| Ingredients | % Composition Dry Wt. Basis |
| --- | --- |
| Dibutyl Phthalate | 0.60 |
| Dispersant ("DAXAD"—30) | 0.30 |
| Ethylene Glycol | 1.00 |
| Chemical Additive | 0.18 |
| Antifoam Nopco PD. No. 1 | 0.10 |

In commercial use, poly(vinyl alcohol) is normally added in conjunction with spray dried poly(vinylacetate) latex in order to obtain some measure of low temperature adhesion of the tape joint cement. However, the addition of poly vinyl alcohol results in a formulation which is not borax stable and consequently the limited benefits derived are offset by the disadvantages of a non-borax stable formulation. The formulation containing the chemical additive of the present invention had adhesion characteristics as indicated below and more significantly the formulation is borax stable:
ADHESION
72°F.—50% R.H. — 99.7
43°F.—81% R.H. — 99.6

EXAMPLE 5

Two batches of ready-mix cement were prepared in a manner similar to Example 1 from the following recipe:

| Ingredients | % Composition Dry Wt. Basis |
| --- | --- |
| Calcium Carbonate | 47.53 |
| Mica | 15.00 |
| Asbestos | 9.00 |
| Clay | 15.00 |
| Attagel—40 | 2.00 |
| (Cellosize QP—10,000) Cellulosic Thickener | 0.50 |
| Bacteriastat ("Dowicide" A) | 0.20 |
| Poly(vinylacetate) latex | 8.00 |
| Dibutyl Phthalate | 0.80 |
| Dispersant ("Daxad"—30) | 0.60 |
| Ethylene Glycol | 1.00 |
| Chemical Additive | 0.27 |
| Antifoam | 0.10 |

These two batches were evaluated as both a ready-mix and as a reconstituted dry-mix tape joint cement.
the dry-mix was prepared by drying one batch of the ready-mix on a Teflon covered glass cloth, micropulverizing through a 0.027 inch screen, and reconstituting with the original water content. A 60 minute mixing at 79 rpm. in a one-gallon Baker-Perkins mixer gave the tape joint cement an appearance one would expect if hand mixing at home.

Analysis of the ready-mix and dry-mix coments indicated the following adhesion and workability properties:

| | | Ready-Mix | Reconstituted Dry-Mix |
| --- | --- | --- | --- |
| Adhesion at | 72°F.-50% R.H. | 100.0 | 100.0 |
| | 43°F.-81% R.H. | 99.9 | 46.1 |
| Workability | | Very Good | Very Good |

EXAMPLE 6

The procedure of Example 5 was repeated except that the two batches of ready-mix cement were prepared from the following ingredients:

| Ingredients | % Composition Dry Wt. Basis |
|---|---|
| Calcium Carbonate | 33.92 |
| Mica | 30.00 |
| Asbestos | 9.00 |
| Clay | 15.00 |
| Attagel—40 | 2.00 |
| Cellulosic Thickener | 0.50 |
| Bacteriastat ("Dowicide" A) | 0.20 |
| Poly(vinylacetate) latex | 6.00 |
| Dibutyl Phthalate | 1.50 |
| Dispersant ("DAXAD"—30) | 0.60 |
| Ethylene Glycol | 1.00 |
| Chemical Additive | 0.18 |
| Antifoam | 0.10 |

The ready-mix and dry-mix cement were evaluated and the results are indicated below:

| | Ready-Mix | Reconstituted Dry-Mix |
|---|---|---|
| Adhesion | 72°F.–50% R.H. 99.9 | 99.6 |
| | 43°F.–81% R.H. 96.5 | 47.6 |
| Workability | Very Good | Very Good |

As will be evident from Examples 5 and 6, the chemical additive imparts good room temperature and low temperature adhesion in the ready-mix system as well as very good workability. In addition the ready-mix can be reconstituted into a dry-mix while maintaining the adhesive qualities at room temperature and workability of the ready-mix although differing somewhat from the low temperature adhesion of the ready-mix. To the best of our knowledge, this is the first time that a satisfactory dry-mix was obtained from a ready-mix tape joint cement.

Examples 7 and 8 demonstrate the preparation of dry-mix from the ingredients normally used to prepare a ready-mix.

EXAMPLE 7

A dry-mix cement was prepared from the following ingredients:

| Ingredients | Dry Grams | % by Wt. |
|---|---|---|
| Calcium Carbonate | 1968.6 | 49.21 |
| Mica | 600.0 | 15.00 |
| Clay | 600.0 | 15.00 |
| Asbestos | 360.0 | 9.00 |
| "Attagel" | 80.0 | 2.00 |
| Antifoam | 4.0 | 0.10 |
| Spray dried cement additive | 7.4 | 0.18 |
| Cellulosic Thickener | 20.0 | 0.50 |
| Poly(vinylacetate) (spray-dried) | 240.0 | 6.00 |
| Triglycol Dibenzoate | 48.0 | 1.20 |
| Ethylene Glycol | 40.0 | 1.00 |
| Bacteriastat("Dowicide" A) | 8.0 | 0.20 |
| Dispersant (DAXAD—30, 30% aqueous) | 24.0 | 0.60 |

The above ingredients were pre-mixed in a separate container as follows:

Triglycoldibenzoate, "Daxad"—30, ethylene glycol, and dibutyl phthalate in one container and remaining components in a one-gallon Baker-Perkins mixer.

The dry powders in the mixer were stirred at 79 r.p.m., during the stirring operation, the liquids were fed, dropwise, from the first container through the mixer sight glass into the dry components. A free-flowing powder was obtained.

Water was added to the dry-mix, worked up to a suitable consistency and evaluated for workability and adhesive properties in the same manner as the preceding examples. The results are indicated below:

ADHESION
72°F.—50% R.H. — 98
43°F.—81% R.H. — 87.2

WORKABILITY
Fair

EXAMPLE 8

A dry-mix cement was prepared from the following ingredients:

| Ingredients | Dry Grams | % by Wt. |
|---|---|---|
| Calcium Carbonate | 964.7 | 48.23 |
| Mica | 306.9 | 15.35 |
| Clay | 300.0 | 15.00 |
| Asbestos | 180.0 | 9.00 |
| "Attagel" | 40.0 | 2.00 |
| Antifoam | 2.0 | 0.10 |
| 16.7% of Chemical Additive on $CaCO_3$ (As a dry powder) | 3.7 | 0.18 |
| "Cellosize" QP—10,000, powder | 20.0 | 1.00 |
| Dibutyl Phthalate (16.9% on $CaCO_3$) | 24.0 | 1.20 |
| Ethylene Glycol | 20.0 | 1.00 |
| Dowicide—A Bacteriastat (powder) | 4.0 | 0.20 |
| "DAXAD"—30 3.32% on Mica | 14.6 | 0.73 |
| Poly(vinylacetate) 27.2% on Mica | 120.0 | 6.00 |

The chemical additive was mixed with $CaCO_3$ and dried to form a dry powder.

These three items were then mixed with the remaining dry ingredients and the ethylene glycol was then added incrementally to the mixing ingredients through the sight glass of the mixer.

After the addition of water as in Example 7, the resultant wet cement was evaluated and the results obtained are as follows:

ADHESION
72°F.—50% R.H. — 98.9
43°F.—81% R.H. — 90.5

WORKABILITY
Very Good

EXAMPLE 9

This Example describes the preparation of a TJC binder concentrate and its subsequent use in the preparation of a dry-mix tape joint compound.

Calcium carbonate (No. 1 white), 2,000 g., sufficient poly(vinylacetate) latex of total solids 58.0 percent to yield 439 grams PVA on a dried basis and sufficient chemical additive of the present invention of a total solids concentration of 30 percent to yield 13.6 grams of additive on a dry basis were mixed and dried overnight. The dried mixture was micropulverized to a fine powder.

To 120 grams of this dry concentrate were added 971.7 grams of $CaCO_3$, 300.0 g mica, 300 g. clay 180.0 grams asbestos, 40.0 grams of Attagel—40, 2.0 grams of antifoam (Nopco PD No. 1) 20.0 g of "Cellosize" (QP—10,000) 14.6 grams of $CaCO_3$ containing 16 percent DAXAD-30 and 4.0 g. of bacteriastat ("Dowicide"-A) and charged to a mixer. While mixing, a mixture of 20.0 grams ethylene glycol and 24.0 g. of dibutyl phthalate was fed dropwise to the dry components.

After mixing for one hour the contents were discharged as a dry-mix tape joint compound. Upon the addition of 35.0 percent of water to the dry-mix with suitable stirring a ready-mix of good body, showing a buttery-type consistency was obtained.

After the addition of water as in Example 8, the resultant wet cement was evaluated and the results obtained are as follows:

ADHESION

72°F.—50% R.H. — 99.1
43°F.—81% R.H. — 99.6

WORKABILITY

Very Good

As willl be evident from the foregoing examples, incorporation of the chemical additive of the present invention to ready-mix systems containing poly(vinylacetate) as the binding agent improves the properties such as workability and adhesion properties. In addition, it is now feasible to produce a dry-mix cement from a ready-mix tape joint cement which has substantially the same room temperature adhesion properites as the original ready-mix cement and if the dry-mix cement is prepared such as described in Examples 7, 8 and 9 then the low as well as room temperature adhesion properties are comparable with those of the ready-mix cement.

Evaluation has shown that the tape joint cements produced according to the present invention have excellent storage stability, i.e., the tape joint cement has a shelf life of three to four months without loss of effectiveness.

What is claimed is:

1. In a tape joint cement composition comprising (a) an inert filler, and (b) a binder, szid binder comprising solid poly(vinyl acetate) selected from the group consisting of vinyl acetate homopolymer and copolymers of vinyl acetate with at least one comonomer selected from the group consisting of dibutyl maleate, dibutyl fumarate, vinyl propionate, ethyl acrylate, butyl acrylate, and 2-ethylhexyl acrylate, the improvement of incorporating in said tape joint cement composition (c) from about 0.5 to about 5 weight per cent, based upon the weight of said binder, of poly(1,2-dimethyl-5-vinylpyridinium methyl sulfate) homopolymer, said poly(1,2-dimethyl-5-vinylpyridinium methyl sulfate) homopolymer having a reduced viscosity of from 0.8 to 1.5 in 0.5 M sodium bisulfite.

2. The tape joint cement composition of claim 1 wherein said binder is vinyl acetate homopolymer.

3. The tape joint cement composition of claim 1 wherein said binder is spray dried vinyl acetate homopolymer.

4. The tape joint cement composition of claim 1 wherein said filler is selected from the group consisting of calcium carbonate, clay, mica, silica, and asbestos.

* * * * *

UNITED STATES PATENT OFFICE
CERTIFICATE OF CORRECTION

Patent No. 3,867,335          Dated February 18, 1975

Inventor(s) D. H. Reed and Edward C. Seltzer

It is certified that error appears in the above-identified patent and that said Letters Patent are hereby corrected as shown below:

Column 1, line 52, "becuase" should read --- because ---.
Column 9, line 23, "properites" should read --- properties ---.
Column 10, line 7, "szid" should read --- said ---. Column 10, lines 12 and 13, after "butyl acrylate" insert --- isobutyl acrylate ---.

Signed and Sealed this seventh Day of October 1975

[SEAL]

Attest:

RUTH C. MASON
Attesting Officer

C. MARSHALL DANN
Commissioner of Patents and Trademarks